United States Patent [19]

Thielen

[11] 3,997,066
[45] Dec. 14, 1976

[54] TOBACCO LATHING AND SPACING MACHINE
[76] Inventor: Ernest M. Thielen, R.F.D. No. 2, Richmond, Minn. 56368
[22] Filed: Apr. 2, 1975
[21] Appl. No.: 564,661
[52] U.S. Cl. .............................. 214/5.5; 56/27.5; 294/5.5
[51] Int. Cl.² ....................................... A01D 45/16
[58] Field of Search ................... 214/5.5; 294/5.5; 56/27.5

[56] References Cited
UNITED STATES PATENTS
3,798,884  3/1974  Middleton ...................... 56/27.5

Primary Examiner—Robert J. Spar
Assistant Examiner—George F. Abraham
Attorney, Agent, or Firm—Donald A. Jacobson

[57] ABSTRACT

A machine for automatically inserting a lath through the stems of tobacco plants while maintaining a fixed spacing between the plants. The spacing can be preset over a continuous wide range. The plants are steered to the point of a spear by a guide which withdraws or advances two arms an equal amount on each side of a spear, thus always keeping the plant centered. The plants are skewered by the spear, which contains a lath in a hollow core, and slid over the spear to be deposited over the lath.

7 Claims, 15 Drawing Figures

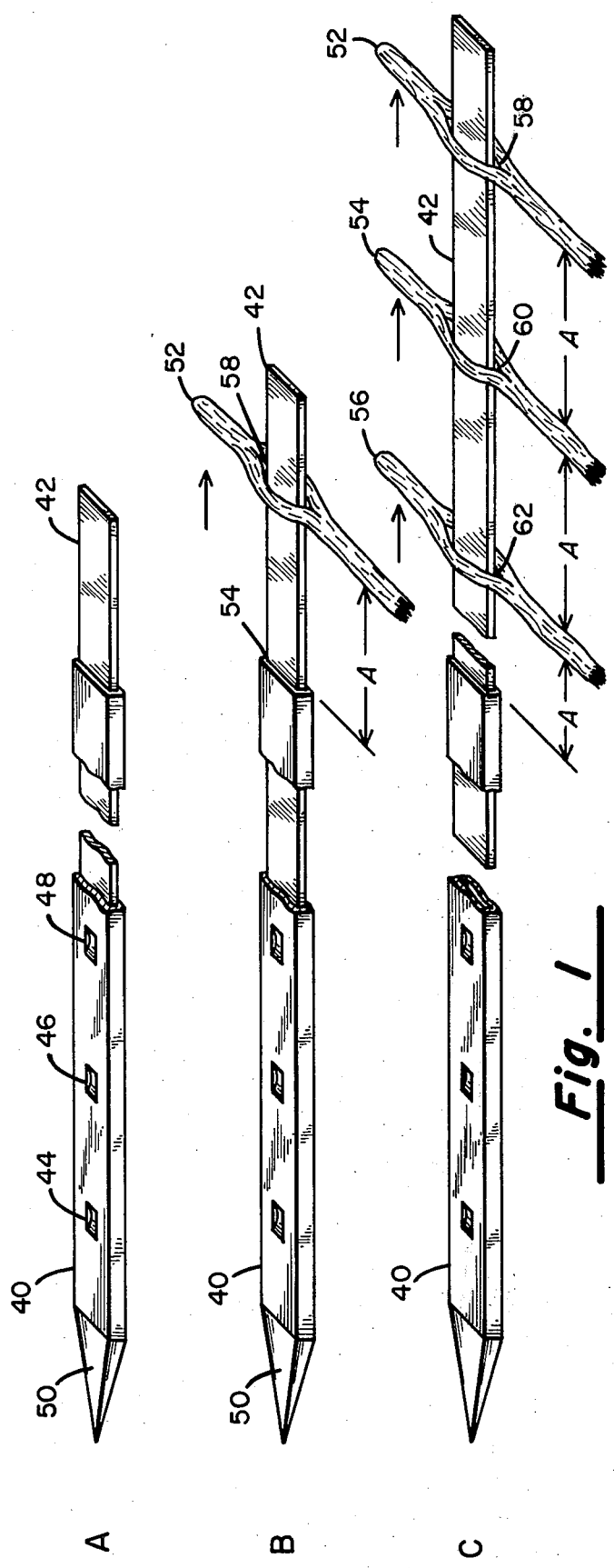
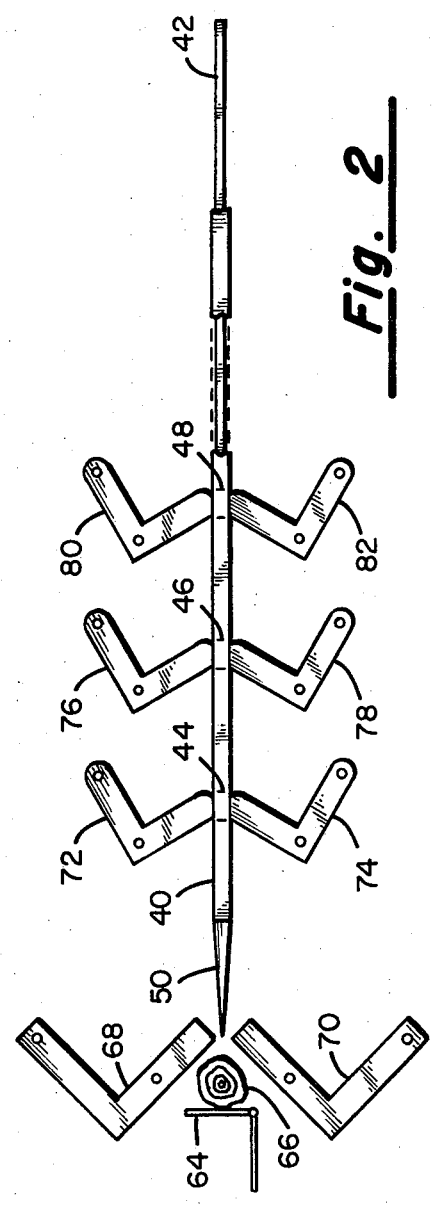
Fig. 1
Fig. 2

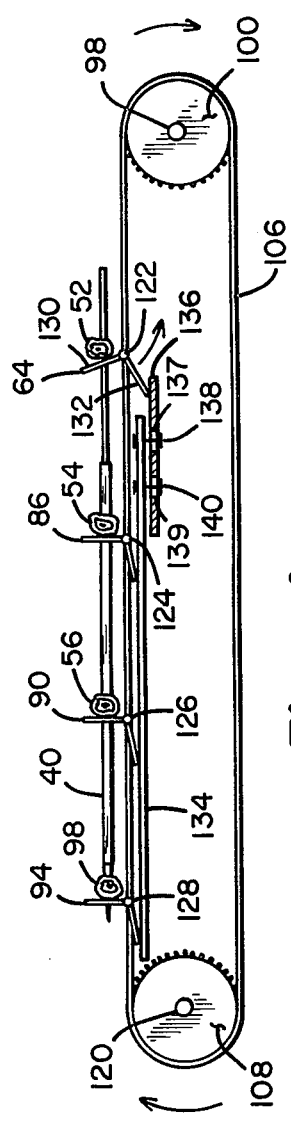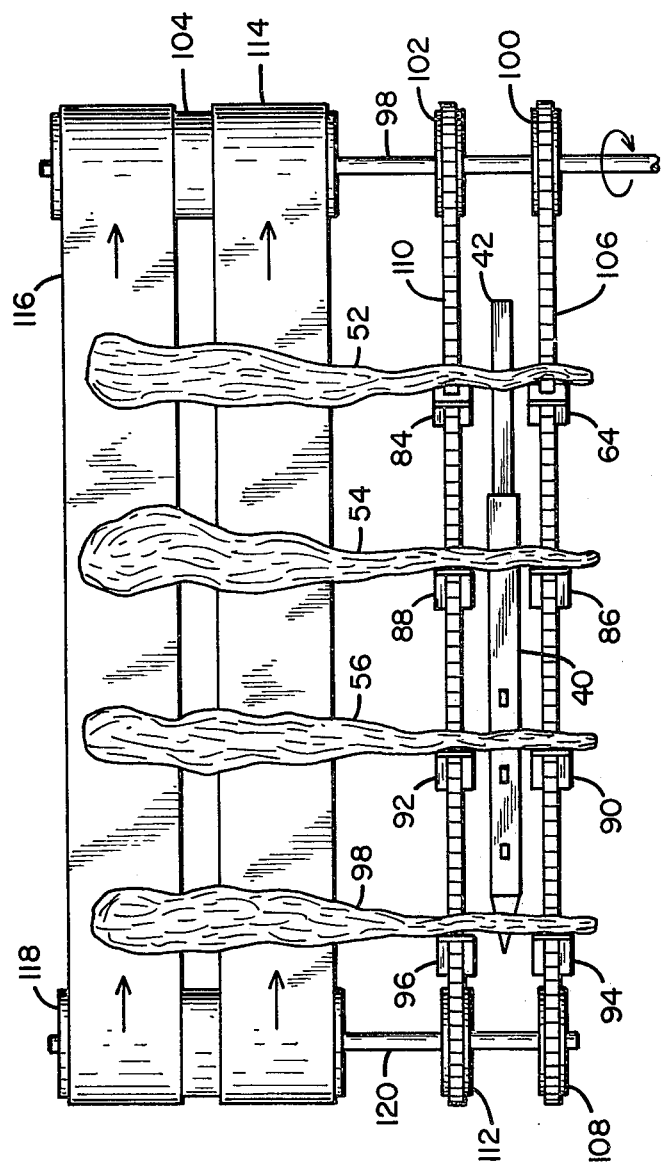

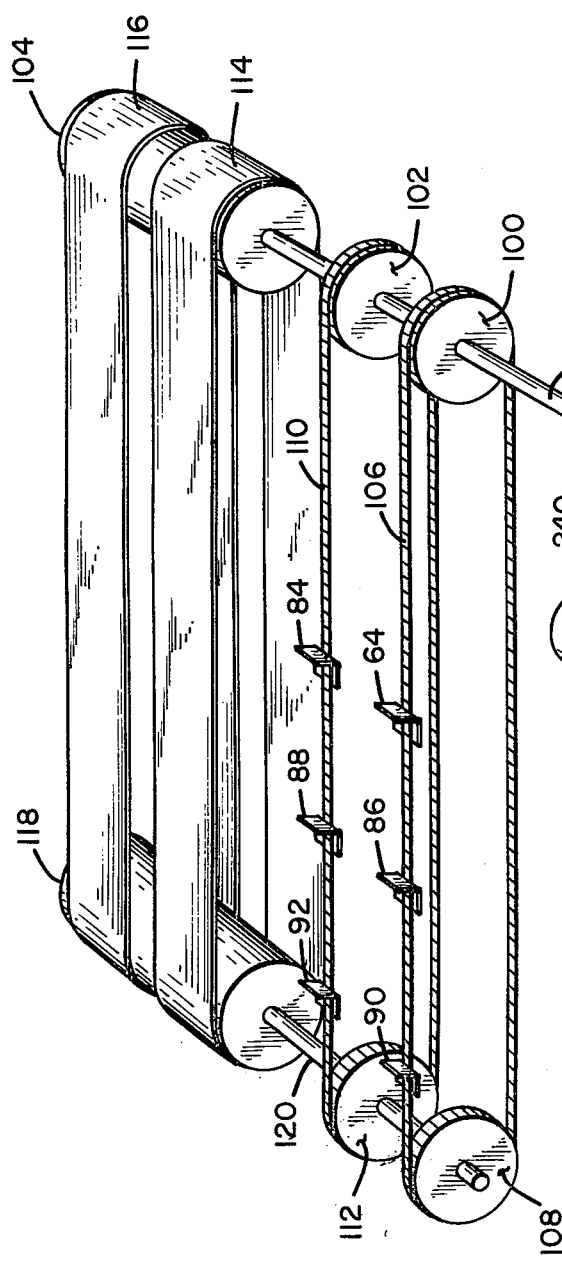
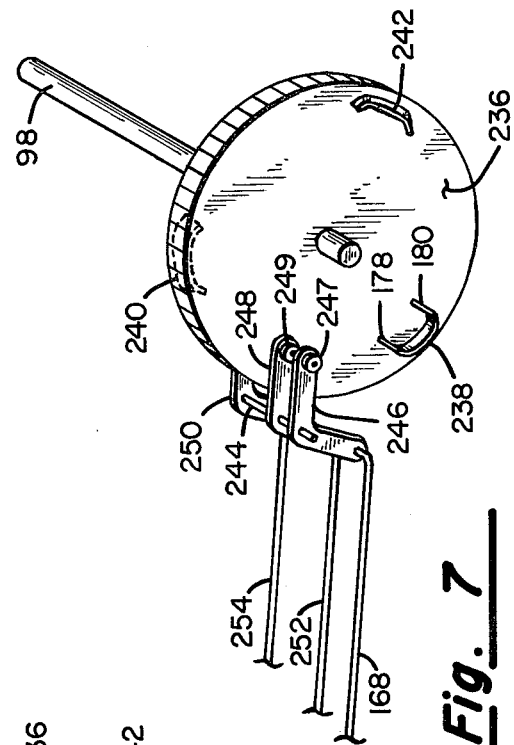

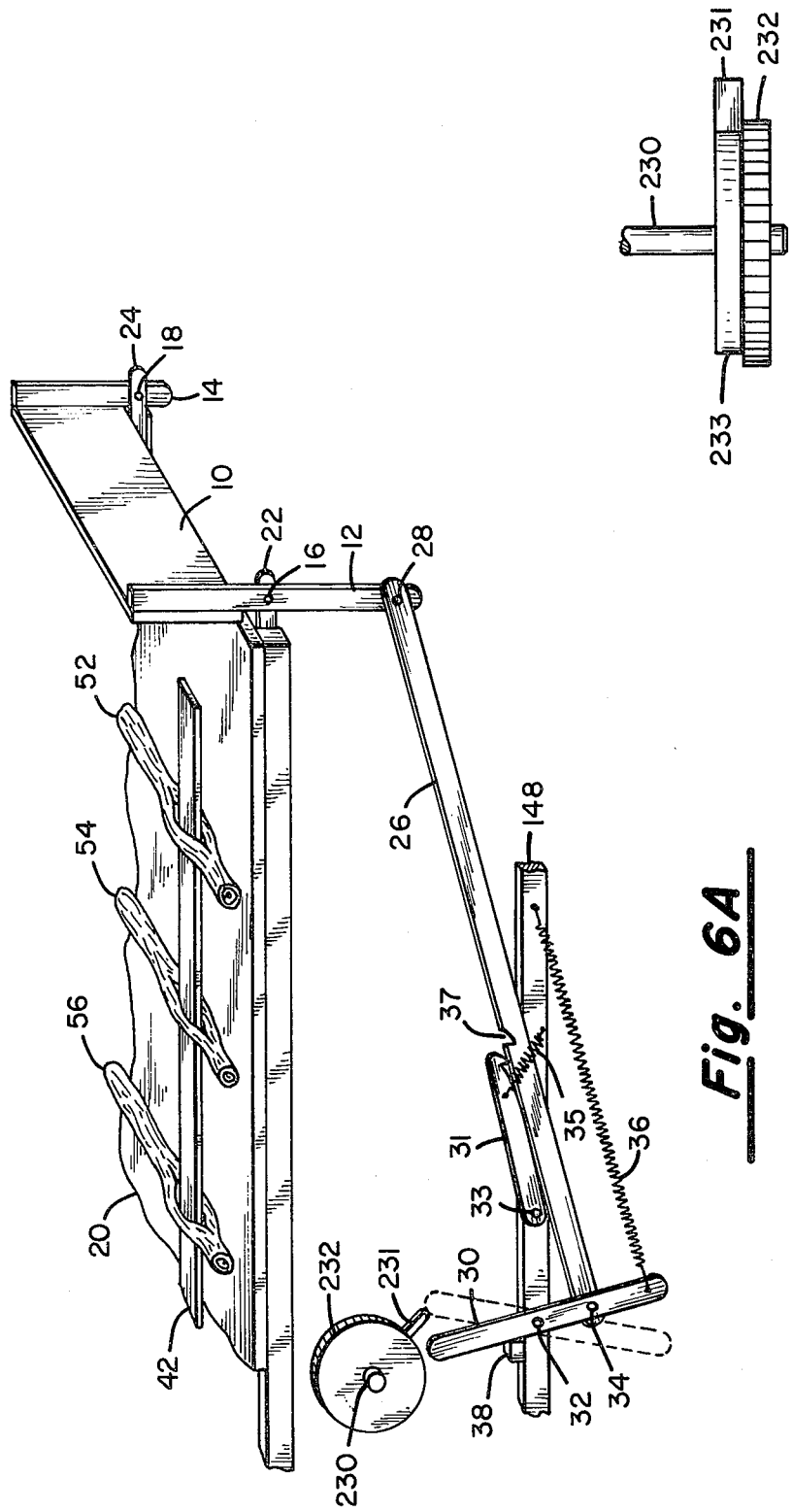
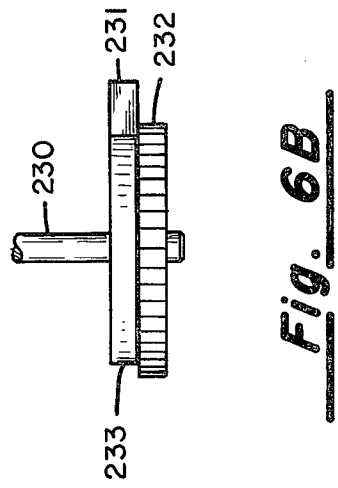
Fig. 6A
Fig. 6B

TOBACCO LATHING AND SPACING MACHINE

BACKGROUND OF THE INVENTION

It is necessary in the curing of tobacco to dry the leaves for a period of time after the harvest. The most common method of doing this is by the use of laths inserted through the stems of the plants permitting a number of the plants to be hung to dry at the same time.

A number of devices have been developed to permit the lath to be inserted through the stems of tobacco plants. However, existing devices lack certain desirable features offered by the present invention.

In order to optimize the use of laths, a uniform spacing should be maintained between plants. This spacing should be capable of adjustment over a wide range of values to accomodate variations in plant size, moisture content etc. Previous devices have not permitted this type of adjustment.

Devices have been developed which utilize a hollow spear having a point at one end. A lath may be inserted into the hollow spear and as plants are pierced by the spear they are fed onto the lath. The prior art apparatus used to guide the tobacco plant to the spear point and, from there, over the spear and onto the lath have not been altogether satisfactory. For example, the weight of the plant on the guides to the spear point often deflected the plant from the point. Further, in some embodiments the plant itself was required to force its way past spear holding means thus tearing or otherwise damaging the plant.

SUMMARY OF THE INVENTION

The present invention relates to a mechanism for inserting a lath through tobacco plant stems and more specifically to a machine which loads a lath with plants, the machine allowing for the presetting of the spacing through a wide range of values.

In carrying out the invention, a hollow spear, having a lath inserted almost to its full length within the spear is used. The plants are guided one-by-one such that their stems abut the center of the spear point. After piercing the stem, the plants are slid over the spear, and beyond the spear for a fixed distance, carrying the lath with the plant, whereupon the force is removed. The next plant will repeat the process, resulting in an equal spacing between plants.

A pair of upper and lower guide arms on each side of the spear point assure that the plants are centered with respect to the spear. A unique feature of the present invention is that as plants of varying size are forced against the guide arms, the arms approach he spear point, each by the same amount, thus always presenting a gap which is the size of the plants cross-section and which is always exactly centered in front of the spear point.

The spear has a rectangular cross-section and is held in a horizontal plane by three pairs of opposed upper and lower dogs which cooperate with opposed slots formed in the upper and lower surfaces of the spear. These dogs are caused to open, one set at a time, at the approach of the plants and the opening is in synchronism with the position of the plants such that only one pair of dogs is released at any one time. This permits the spear to be held fixed in space as a plant is slid the full length thereof with no requirement for the plant itself to apply a force to open or act against any holding means. This eliminates any tearing and damage to the plants as they are strung on the lath.

The point where the driving force against the plant is discontinued can be varied over a wide continuous range, thus permitting the adjustment of the spacing between the plants.

OBJECTS

It is accordingly a general object of the present invention to provide a new and improved machine for inserting a lath through tobacco plants, preparatory to their being arranged in a drying shed.

It is a more particular object of the present invention to provide a means for assuring that the plants have their stems centered upon a lath and that no opposing force is exerted against the plants themselves for operating the spear holding means.

It is another object of the present invention to provide a uniform spacing between tobacco plants upon a lath while permitting the spacing to be preset to a wide continuous range of values.

It is yet another object of the present invention to provide a new and improved lath inserting mechanism which is extremely simple in design, easy to operate, and which has a minimum of parts.

These and other objects and advantages of the invention will become apparent to those skilled in the art from a reading of the following detailed description.

BRIEF DESCRIPTION OF THE DRAWINGS

FIGS. 1A, 1B and 1C illustrate a spear with a lath inserted therein for successive locations of tobacco plants.

FIG. 2 illustrates the side view of the spear and particularly shows the spear holding dogs and plant guide arms.

FIG. 3 is a plan view of the plant transport and associated lath loading machanism.

FIG. 4 is the end view of the plant transport mechanism.

FIG. 6 is an isometric pictorial view of the plant transport and drive mechanism.

FIG. 6A is an isometric pictorial view of the shut-off mechanism.

FIG. 6B is a side view of the axle, clutch and sprocket drive mechanism.

FIG. 7 is an isometric pictorial view of the spear holding dog synchronizing mechanism.

DETAILED DESCRIPTION OF THE PREFERRED EMBODIMENT

Figure 5:
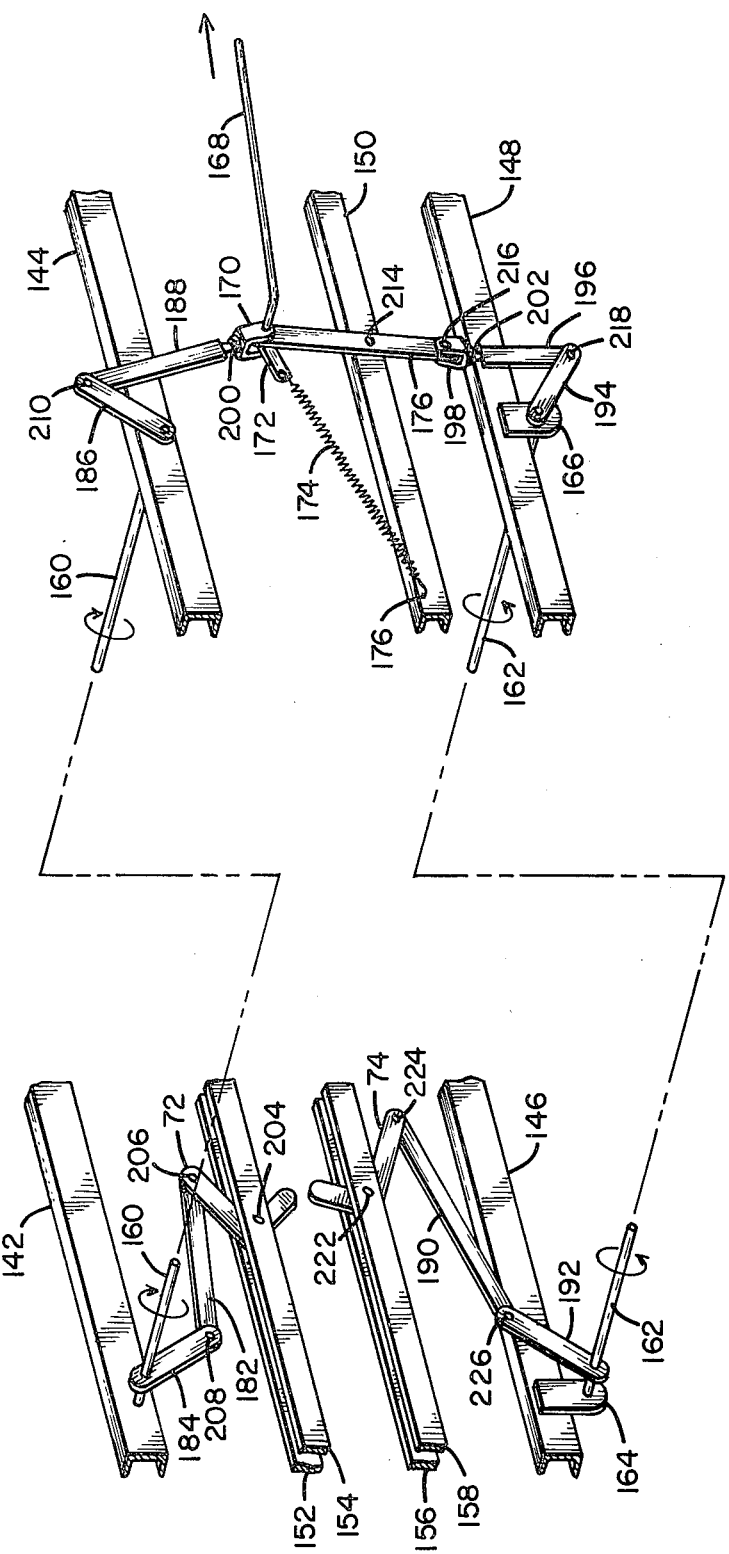
FIG. 5 is an isometric pictorial view of the mechanism which operates one set of spear holding dogs.

Referring first to FIGS. 1A through 1C, the cooperation of a spear 40 with a lath 42 in loading successive stalks of tobacco 52, 54, and 56 can be seen. In FIG. 1A a hollow spear 40 of rectangular cross-section is dimensioned such that a lath 42 also having a rectangular cross-section can be inserted into its open blunt end. There are three slots 44, 46 and 48 which pass trough spear 40 from top to bottom. The purpose of these slots will be explained later. The spear 40 has a pointed tip 50 used to pierce the stem end of the tobacco stalks. The lath 42 is adapted to be inserted into the spear 40 to a point just short of slot 48.

In FIG. 1B it is assumed that a tobacco stalk 52 has been forced against point 50, pierced and then forced to the right over the complete length of spear 40 to the blunt end 54. As the stalk 52 is forced past the blunt end 54 the opening 58 in the stalk closes about lath 42 thus gripping it and carrying the lath 42 rightward a distance A, at which point the force aganst stalk 52 on the stem end is terminated.

In FIG. 1C it is assumed that this process has been repeated three tmes for stalks 52, 54 and 56 the stalks being pierced at openings 58, 60 and 62 respectively. Since three stalks have been forced rightward the lath has been moved the same distance A three times thereby producing an equidistant spacing of the said stalks on lath 42. This process is repeated until the lath 42 has been filled with stalks for its entire length at which time the mechanism is stopped, the filled lath removed, a new lath inserted the full distance into the spear and the process repeated. The mechanism necessary to accomplish these steps will be described later.

In FIG. 2 forcing arm 64, stalk 66, upper guide arm 68, lower guide arm 70, upper spear holding dogs 72, 76 and 80 and lower dogs 74, 78 and 82 are shown. In operation, forcing arms 64 (and 84 FIG. 3) move tobacco stalk 66, shown in cross-section rightward against upper guide arm 68 and lower guide arm 70. These guide arms are so arranged that they will both withdraw or draw together equal amounts from the spear pont to permit larger or smaller stalks to pass through the opening there between which maintains the centering effect of the said guide arms, regardless of the stalk size. This mechanism will be discussed later. As mentioned, forcing arm 64 has a counter-part 84, shown in FIG. 3 but not shown in FIG. 2, the two being located on opposite sides of the spear, guide and spear holding dogs. The use of two opposed forcing arms permits the forcing arms 64 and 84 to force stalk 66 against the guide arms 68 and 70, where the stalk 66 is centered with respect to the spear point 50; then rightward over the spear 40. As stalk 66 is moved by the forcing arms 64 and 84 to a position in proximity to spear holding dogs 72 and 74, the dogs are withdrawn from slot 44 and the spear 40 remains held in place by the spear holding dogs 76, 78, 80 and 82. When stalk 66 moves to the right beyond slot 44, dogs 72 and 74 again close and engage slot 44. As stalk 66 approaches dogs 76 and 78 these dogs open and are withdrawn from slot 46. The spear is now held only by dogs 72, 74, 80 and 82. When stalk 66 clears slot 46, dogs 76 and 78 re-engage slot 46. This process is repeated with dogs 80 and 82 with the spear then being held by dogs 72, 74, 76 and 78. The mechanism for synchronizing the position of the stalk with the disengaging and reengaging of the spear holding dogs will be discussed later. This mechanism permits a stalk 66 to be forced over the full length of the spear 40 while the spear is still held in a fixed horizontal position. When stalk clears spear 40, the stalk will grip lath 42 because of the resiliency of the pierced stalk, and the stalk and lath 42 will be carried rightward by forcing arms 64 and 84 pushing against the stalk for a given distance A, where the forcing arms 64 and 84 are disengaged and the lath 42 held in this place by the skewing of the stalk 66. The disengagement mechanism and skewing mechanism will be discussed later.

The mechanism for moving the stalks rightward over the spear and for disengaging the forcing arms at a given point rightward of the spear is illustrated in FIGS. 3 and 4. Pairs of forcing arms 64, 84; 86, 88; 90, 92; and 94 and 96 are shown in FIG. 3, which members comprising said pairs of arms are located on opposite sides of spear 40 and lath 42 and bear against tobacco stalks 52, 54, 56 and 98, respectively. A driven shaft 98 is attached to and drives sprockets 100, 102, and a drum 104. A chain 106, driven by sprocket 100, drives a sprocket 108. A chain 110, driven by sprocket 102, drives a sprocket 112. Belts 114 and 116 are driven by pulley 104 and, in turn, drive a drum 118. Sprockets 108 and 112 and drum 118 are attached to a shaft 120 which is free to rotate. Shaft 98 rotates clockwise as viewed in FIG. 4, driving chains 106, 110 and belts 114, 116 rightward as illustrated by the arrows on the belts in FIG. 3. Sprockets 100, 102, 108, 112 and drums 104 and 118 all have the same effective diameter. This results in chains 106, 110 and belts 114, 116 being carried rightward at the same velocity by the action of the drive shaft 98. As can best be seen in FIG. 3, forcing arms 64, 86, 90 and 94 are attached to chain 106 and forcing arms 84, 88, 92 and 96 are attached to chain 110.

This results in the stalks being supported along their full length and carried rightward with no skew. Using stalk 52 as an example, the leaf end is supported and carried rightward by belts 114 and 116 while the stem end is carried rightward by forcing arms 64 and 84, and is supported by chains 106 and 110. Since the belts and chains move at the same velocity there is not tendency for either the leaf end or the butt end to move faster or slower than the other end which would result in skew of the tobacco plant with respect to the spear and lath.

With reference to FIG. 4, the mechanism whereby the forcing arms engage and disengage from the stalks can be seen. Forcing arm 64 is free to pivot about its attachment point 122 to chain 106 as are arms 86, 90 and 94 pivotable about attachment points 124, 126 and 128 respectively.

As can be seen most clearly by observing the forcing arm 64, the arm is L shaped with two perpendicular projections 130 and 132 extending from the attachment point 122. The upper projection 130 is the portion of the forcing arm that engages the stalk. The forcing arm 64, being free to rotate, would be forced counterclockwise about its attachment point 122 by the force it exerts against stalk 52, were it not for a plate 134 and a moveable plate 136 secured thereto. Plate 134 is mounted immediately under the upper sequent of chains l06 and 110 such that the rearward projections from the forcing arms bear against the said plates thus keeping the rearward projection in an essentially horizontal attitude and, in turn, keeping the upper projections of the forcing arms in an essentially vertical attitude. The upper projections of the said forcing arms being held vertical will bear against the stalks and carry then rightward. Plate 134 does not span the entire distance under the chains but terminates a shot distance from the right hand gears and pulley. A second moveable plate 136 is secured to the fixed plate 134 by fasteners 138 and 140. Plate 136 has the same width as plate 134, such that the rearward projections from the forcing arms bear against it as against fixed plate 134. The moveable plate 136 has a pair of slots 137, and 139 which match the fasteners 138 and 140 respectively through the fixed plate 134 which permits the moveable plate to be attached to project rightward a number of different distances from the fixed plate 134. Since the rightward edge of moveable plate 136 determines where the rearward projections of the forcing arms are free to rotate, which in turn disengages the forcing arm from the stalk, this permits an adjustment of the point of disengagement of the forcing arm from the stalk.

This possibility of the attachment of the moveable plate 136 in a number of location permits changing of the spacing of the stalks upon the lath. If the said plate is attached such that its right edge is a maximum distance to the right of fixed plate 134, the distance between the stalks on the lath will be a maximum, whereas if the moveable plate 136 is attached with its right edge a minimum distance to the right of fixed plate 134, then the distance between stalks on the lath will be a minimum. At the other end of the cycle, the engagement of the rearward projection of the forcing arms with the left edge of the fixed plate 134 occurs before the stalks reach spear 40 and thus ensures that the stalks will be driven over the full length of the spear.

Referring again to FIG. 3, it can be seen that when forcing arms 64 and 84 disengage from stalk 52 that belts 114 and 116 will continue to carry the leaf end of the stalk rightward. This action will skew the leaf end of stalk 52 rightward, which, in turn, will deflect the end of lath 42. This in turn will bind the lath within spear 40, thus locking the lath in essentially the position it was left by forcing arms 64 and 84 at the point of disengagement. This simple passive adjustment afforded by moveable plate 136 permits the selection of a number of predetermined fixed distances between the stalks on the lath.

The mechanism, whereby the upper and lower spear holding dogs are operated to alternately hold the spear or release it, is illustrated in FIG. 5. This section of the tobacco lathing and spacing machine is representative of all three sets of holding dogs in that they all operate in the same manner. The only distinction between the three is the timing of their operation and synchronization which will be explained later. For purposes of illustration it is assumed that this mechanism will operate the first set of dogs 72, 74.

Referring to FIG. 5, there are a number of structural supporting channels which provide support for the mechanism namely channels 142, 144, 146, 148, 150, 152, 154, 156, and 158. These channels are rigidly attached as a part of the frame of the overall machine as will be shown later. Channels 142 and 146 are in the same vertical plane and are aligned with the slots defined by channels 152, 154 and 156, 158. Channels 144, 150 and 148 are also in the same vertical plane. Channel 142 is in the same horizontal plane as 144 and channel 146 is in the same horizontal plane as 148.

A shaft 160 is rotatably mounted between channels 142 and 144 and shaft 162 is free to rotate within a hole through a projection 164 attached to channel 146 and a hole through a projection 166 secured to channel 148. The mechanism is driven by a rod 168 which is pulled to the right as indicated by the arrow parallel to the said rod. Rod 168 terminates on the left end in a right angle bend and is inserted through a U-bracket 170, and a coupler 172, both of which have holes to accept the rod 168. Coupler 172 has a hole in the opposite end to receive a tension spring 174. Spring 174 is secured at the opposite end to channel 150 at point 176. Spring 174 provides the return force for the mechanism in that when rod 168 is pulled to the right and then this force released, the rod is pulled back to its original position by the spring.

FIG. 5 illustrates the position of rod 168, when no force is exerted to pull rod 168 to the right.

There are two dogs, namely an upper dog 72 and a lower dog 74, which engage the upper and lower openings respectively of slots 44 (FIG. 1) in the spear. The remaining mechanical linkages are couplings 182, 184, 186, 188, 190, 192, 194, 196, U-bracket 198, adjustments 200 and 202. Pins 204, 206, 208, 210, 214, 216, 218, 220, 224 and 226 provide pivot points for the mechanism and hold the various elements together where indicated through holes in the other elements.

The operation of upper dog 72 will be considered first. With rod 168 in its present position, the upper dog 72 engages the upper opening in slot 44 in spear 40, thus securing it in position. Moving rod 168 to the right with U-bracket 170 acting through adjustment 200, coupling 188 and pin 210; pulls down on coupling 186 which is attached to shaft 160 and causes the said shaft to rotate clockwise as indicated in FIG. 5. Coupling 184 is attached to shaft 160 and is rotated rightward carrying pin 208 and coupling 182 to the right. Coupling 182 acting through pin 206 on upper dog 178, said dog being free to rotate about pin 204, rotates the dog counter-clockwise thus lifting the lower end of dog 72 into the slot between channels 152 and 154. Consequently it can be seen that pulling rod 168 rightward moves the lower portion of upper dog 72 upward which removes the dog from slot 44 in spear 40, thus releasing it and that returning rod 168 to the left by means of spring 174, acting upon the rod through coupling 172, will reengage the dog with the slot in the spear.

The effect of moving rod 18 rightward on the lower dog 74 will now be considered. This action will rotate coupling 176 clockwise, U-bracket 198 will pivot about pin 216 and transmit the resulting leftward movement of pin 216 to coupling 196 through adjustment 202. Coupling 196 will be lifted and moved leftward, which will act through pin 218 and rotate coupling 194 counter-clockwise about shaft 162. Coupling 194 is attached to shaft 162 which will be rotated counter-clockwise as indicated on FIG. 5. Coupling 192 is attached to shaft 162 and is also rotated counter-clockwise about shaft 162. Coupling 192 rotating with shaft 162 pulls coupling 190 leftward through pin 226, which pulls pin 224 leftward, thus rotating lower dog 180 counter-clockwise about pin 222. This rotation of lower dog 180 lowers the upper portion of dog 74 into the slot between channels 156 and 158. It can thus be seen here too tht pulling rod 168 rightward moves the upper portion of lower dog 74 downward which removes the dog from slot 44 in spear 40, thus releasing it, and that returning rod 168 to the left by means of spring 174, acting upon the rod through coupling 172, reengages the dog with the spear.

Adjustments 200 and 202 provide a means for increasing or decreasing the distance between coupling 188 and U-bracket 170 and between coupling 196 and U-bracket 198 respectively. This provides an adjustment of the distance between the dogs when they are in a closed position.

The synchronization of the three sets of dogs is illustrated in FIGS. 6 and 7. It is necessary to synchronize the operation of the dogs with the passage of the stalks over the spear such that not only do each pair of dogs disengage at the proper time, to allow the stalk to pass by, but also that the dogs operate in the correct sequence and further to insure that only one pair of dogs is open at any one time. Essentially, the operation of the dogs must be synchronized with the position of the forcing arms which carry the stalks with them.

The essential elements required to synchronize the forcing arms with the operation of the dogs and to disengage the system when the lath is full are illustrated in FIGS. 6 and 7. A prime mover 228, which is illustrated as an electric motor, but which can also be a gasoline engine or other power source, has a shaft 230 to which is attached a sprocket 232. While sprocket 232 is not directly attached to shaft 230, clutch assembly is disposed there between to permit selective engagement and disengagement. Sprocket 232 drives a second sprocket 236 through a chain 234. Sprocket 236 has three cam elements 238, 240 and 242 projecting from the side surface of the said sprocket and spaced from one another by 120 degrees at equal radial distances from the center thereof. Cams 238 and 242 are on the front surface of sprocket 236 while cam 240 is on the back surface of the sprocket and is therefore shown by dashed lines. Cams 240 and 242 project the same distance from their respective surfaces of the sprocket, while cam 238 is the same width as the other cams it is held off the surface of the sprocket by pins 178 and 180, which are slightly longer than the width of the other cams. Consequently cam 238 is offset from the surface of sprocket 236 by a slightly greater distance than the width of the inner cams. All three cams have a profile with tapered leading and following edges which are radially displaced from the shaft 98 a lesser distance than the center portion of the cam. The purpose for these projections will be discussed with the operation of the cam followers.

Three cam followers 246, 248 and 250 are rotatably supported by 2 shaft 244. While the supporting structure is not shown here, shaft 244 and shaft 98 are mounted upon the same structure such that the distance and their angular relationship is fixed with respect to one another. The cam followers 246, 248 and 250 have rotating bearing portions 247, 249, 251 engaging the cams to thereby reduce friction.

Rod 168 terminates in a right angle bend and is inserted into a hole in the lower portion of cam follower 246 and is free to rotate but has an enlarged head or bend on the opposite surface to hold it in place. Rods 252 and 254 are likewise bent and inserted into holes in cam followers 248 and 250.

The fixed relationship between successive linear positions of forcing arms 64, 84; 86, 88; 90, 92 relative to the angular positions of cams 238, 240, 242 can be seen. The fact that sprocket 236 and sprockets 100 and 102 are all attached to shaft 98 fixes their angular relationship. Since chains 106, 110 are driven from sprockets 100 and 102 respectively, and, in turn, the forcing arms are attached to the said chains, the relationship of the linear position of the forcing arms relative to the angular position of the cams is fixed.

The operation of the cams can be determined from FIG. 7. Sprocket 236 rotates in a clockwise direction and as it does so, it first brings cam 238 against cam follower roller 247 to activate cam follower 246. Note that cam 238 is aligned with cam follower 246 but not with cam follower 248 because of the cam being offset from the sprocket by an amount equivalent to one cam width which is the distance that cam follower 246 is also offset. Cam follower 246 will be driven to slowly rotate counter-clockwise about shaft 244 upon engaging the tapered leading edge of cam 238. This tapered section of the cam thus displaces the cam follower gradually and not abruptly as the two engage.

As the cam follower 246 continues to rotate about shaft 244, it pulls rod 168 to the right and activates the mechanism previously described in FIG. 5 to release dogs 72 and 74 from slot 44. As cam 238 passes cam follower 246, the cam follower will now rotate slowly clockwise, because of the tapered trailing edge of cam 238. The force for the clockwise rotation is derived from spring 174 (FIG 5) which returns the cam follower 246 to its original position, thus returning the dogs 72 and 74 to their original position within slot 44 on spear 40.

As pulley 236 continues its clockwise rotation, cam 242 will next engage cam follower 248 which will thus be rotated counter-clockwise about shaft 244, thus moving rod 252 rightward. Rod 252 is connected to a dog releasing mechanism identical to that described in FIG. 5, but which drives dogs 76 and 78 rather than dogs 72 and 74. This rightward motion of rod 252 will thus release dogs 76 and 78 from slot 46 and when cam 242 has rotated past cam follower 248, a spring similar to spring 174 returns the dogs to their previous position within slot 46. Note that cam 242 does not actuate cam follower 246 because they are physically offset from each other.

As sprocket 236 continues its clockwise rotation, cam 240 on the back surface of sprocket 236 will engage cam follower 250. Cam follower 250 will be driven counter-clockwise about shaft 244, thus moving rod 254 rightward. Rod 254 is likewise connected to a mechanism identical to that described in FIG. 5 which drives dogs 80 and 82. This rightward motion of rod 254 will thus also release dogs 80 and 82 from slot 48 and when cam 240 has rotated past cam follower 250, a spring similar to spring 174, returns the dogs to their previous position within slot 48.

This sequence of events will be repeated over and over, first releasing dogs 72, 74 from slot 44, then re-engaging the dogs with slot 44, next releasing dogs 76, 78 from slot 46, then re-engaging the dogs with slot 46, and next releasing dogs 80, 82 from slot 48, then re-engaging the dogs with slot 48. This mechanism therefore opens and closes the spear holding dogs in their proper sequence. Since the fixed relationship between the location of the forcing arms and the cams was shown in FIG. 6, the necessary synchronization between the location of the tobacco stalks, carried by the forcing arms, and the cams is provided.

When a lath has been filed with properly spaced tobacco plants, the mechanism must be stopped in order to remove the lath and to insert a new lath into the spear full length for filing. In addition, that part of the cycle where the mechanism is stopped must be such that a tobacco plant is not in the process of being inserted onto the lath. This later requirement means that a shut-off mechanism must be synchronized with the location of the tobacco plants. This shut-off mechanism is illustrated in FIGS. 6A and 6B.

Referring to FIG. 6A, a table 20, having projections 22 and 24 and a trip plate 10, having an elongated projection 12 on one end and a shorter projection 14 on the other end are provided, said projections having holes therein with projections 22 and 12 being rotatably secured by pin 16 and projections 14 and 24 rotatably secured by pin 18.

A connecting arm 26, having holes in each end, is pivotally secured to the lower end of projection 12 by a pin 28, and a trip arm 30, having a hole in its lower end and center, is pivotally secured by a pin 32 and also pivotally attached to the connecting arm 26 by pin 34. Pin 32 secures trip arm 30 to the structural supporting channel 148. A spring 36 is attached to pin 34 at one end and to channel 148 at its opposite end. A stop 38 is secured to channel 148 to limit the counter-clockwise rotation of trip arm 30 about pin 32. A catch 31 is free to pivot about pin 33 which is attached to supporting channel 148. A spring 35 is connected to the catch 31 on one end and to the supporting channel 148 on its opposite end. A notch 37 formed in the connecting arm 26 is adapted to mate with a hook formed on the end of catch 31. Shaft 230 carries a sprocket 232 having clutch projection 231 in close proximity to trip arm 30.

The relationship of shaft 230, sprocket 232, a clutch 233 and clutch projection 231 can be seen more clearly in FIG. 6B.

In operation, a lath 42 loaded with tobacco plants 52, 54, 56 is guided along table 20 and when full, is trhust rightward against trip plate 10 by the operation of the tobacco loading mechanism previously described. Trip plate 10 will be forced rightward and extension 12 will pivot clockwise about pin 16 which, in turn, will move pin 28 leftward carrying connecting arm 26 and pin 34 leftward with it. Pin 34 will, in turn, force trip arm 30 to rotate clockwise about pin 32 and will elongate spring 36. The movement of the upper portion of trip arm 30 clockwise to a new position indicated by dashed lines, will place it in a position to intercept clutch projection 231.

When clutch projection 231 strikes trip arm 30, the clutch 233 is disengaged, disconnecting the power source from the entire mechanism. In addition, the hook end on catch 31 is pulled by spring 35 into notch 37, thus holding connecting arm 26 to the left against the spring tension exerted by spring 36. Further, since all of the mechanism controlling the position of the tobacco plants is driven by a chain drive operating off of sprocket 232, the point of stopping the mechanism is fixed relative to the location of the plants and is selected such that no plant is being inserted upon the lath at that time. This mechanism therefore assures that the loading mechanism is stopped when a lath is full and that no tobacco plant is in the process of being loaded on the lath at the point of stoppage.

With power to the mechanism thus disengaged, the loaded lath is removed and a new lath inserted full length into the spear. The catch 31 is now released permitting spring 36 to return trip arm 30 to its counter-clockwise position which releases clutch extension 231 and restarts the mechanism.

Figure 8:
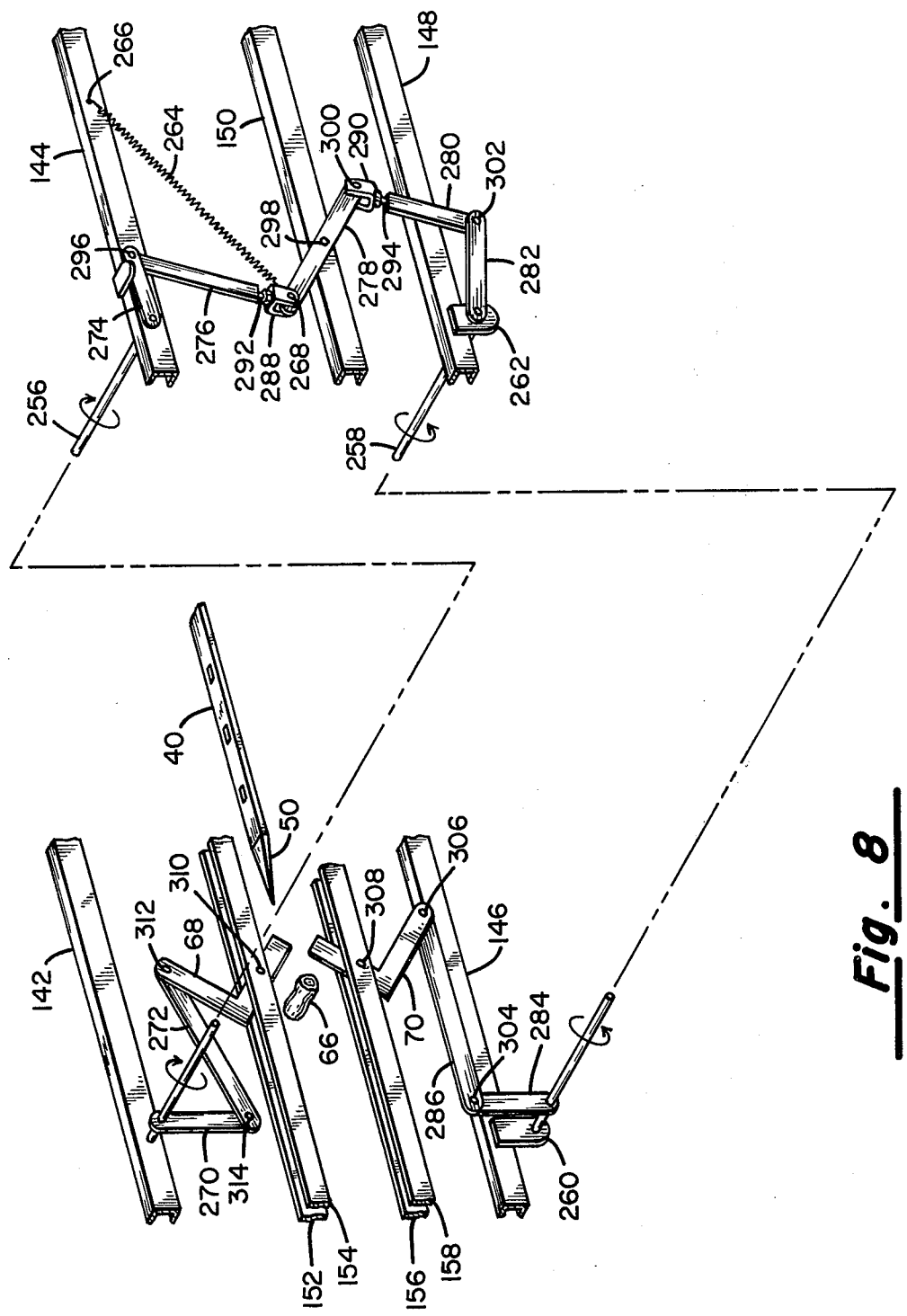
FIG. 8 is an isometric pictorial view of the plant guiding and centering mechanism.

The details of the construction and operation of upper guide arm 68 and lower guide arm 70 (FIG. 2) in centering the stalks on the spear point 50, while both withdrawing or drawing together in equal amounts to permit centering stalks of varying sizes, is illustrated in FIG. 8. This mechanism is mounted upon the same frame structure to the left of that shown in FIG. 5, such that it is immediately forward of spear point 50. The same structural supporting channels, namely channels 142, 144, 146, 148, 150, 152, 154, 156, 158, are used and have the same horizontal and vertical relationship as that specified for FIG. 5.

Shaft 256 is free to rotate clockwise and counter-clockwise within holes drilled through channels 142 and 144 and a second shaft 258 is free to rotate within holes drilled through a projection 260 welded to channel 146 and a hole drilled through a projection 262 welded to channel 148. The mechanism is powered by a spring 264 which is connected to channel 144 at point 266 and restrained by a pin 268 at its opposite end.

The remaining mechanical elements of this system comprise linkages 270, 272, 274, 276, 278, 280, 284, 286, U-brackets 288, 290, threaded adjustment screws 292, 294 and pin connectors 296, 298 300, 302, 304, 306, 308, 310, 312 and 314. Note that the connector pins pass through holes formed in the other elements and are free to rotate within the holes and to permit the other elements to rotate about them. The pins may comprise bolts, or rivets or other similar fasteners such that while they allow freedom of rotation, they secure the rotating elements together.

The operation of this mechanism is similar to that shown in FIG. 5 for the operation of the dogs. Here, however, a spring, 264 provides the operating force. The spring 264 essentially balances any forces generated by the forcing of a tobacco stalk against the upper guide arm 68 and lower guide arm 70. A stalk 66 is shown in cross-section in FIG. 8 in the general position it would be prior to being forced against the guide arm as was also illustrated in FIG. 2. As shown in FIG. 8 the upper guide arm 68 and lower guide arm 70 are separated by a small distance. Under these conditions, spring 264 acting on pin 268 and thence on U-bracket 288 and linkage 278 would have the following effects. Linkage 278 has a pin 298 through its center into channel 150. Spring 264 acting on pin 268 and thence on linkage 278 will rotate the said linkage clockwise about pin 298. At the same time, U-bracket 288 acting through adjustment screw 292 and linkage 276 will move pin 296 in an upward direction; thus moving linkage 274 and shaft 256 counter-clockwise. Linkage 270 is fixedly attached to shaft 256 and is therefore rotated counter-clockwise which moves pin 314 and thence linkage 272 rightward. Pin 312 is carried rightward with linkage 272, thus carrying the upper portion of upper guide arm 68 rightward. Upper guide arm 68 will thus be rotated clockwise about pin 310 further extending the lower portion of the upper guide arm 68 downward from its position between channels 152 and 154.

At the same time, U-bracket 290 is carried downward by the clockwise rotation of linkage 278 acting through pin 300. The downward motion of U-bracket 290 acting through adjustment 294 and linkage 280 will force pin 302 downward. Pin 302 acting on linkage 282, which is fixedly attached to shaft 258, will rotate linkage 282 and shaft 258 clockwise. Linkage 284 is also fixedly attached to shaft 258 and is rotated clockwise by the shaft carrying pin 304 rightward which in turn moves linkage 286 rightward. Pin 306 in linkage 286 will carry the bottom end of the L-shaped lower guide arm 70 rightward which, in turn, causes the upper leg of the lower guide arm to rotate counter-clockwise about pin 308, thus moving the upper leg of lower guide arm 70 upward.

It can be seen that the operation of spring 264 through the respective linkages upon upper guide arm 68 and lower guide arm 70 will continue until the two guide arms touch and provide a counter force to the action of the spring. The linkages are so arranged that upper guide arm 68 and lower guide arm 70 will meet at a point in the same horizontal plane as the point 50 of spear 40. The meeting of the two guide arms provides a V-shaped channel to the said point which are held togeher by the force of spring 264.

The stem end of the tobacco stalk 66 will be oriented approximately as shown in FIG. 8 and FIG. 2 and will be forced against the V-shaped channel previously described. This action will tend to rotate upper guide arm 68 counter-clockwise about pin 310 and lower guide arm 70 clockwise about pin 308. All of the mechanical linkages previously described will be driven in the opposite direction and will ultimately be opposed by a force generated by the elongation of spring 264. The linkages from the upper guide arm 68 and the lower guide arm 70 to spring 264 are arranged such that the respective arms each move a like amount. As a consequence, when stalk 66 is forced against the said guide arms as they move apart, the opening they define will still be centered upon point 50. This mechanism therefore provides a means of allowing varying sized stalks to be guided to the point 50 of spear 40. The spring constant of spring 264 is such that the force generated by the action of stalk 66 against the guide arms is not excessive such that the stalk would be deformed and be unable to open a space between the said guide arms.

Figure 8A:
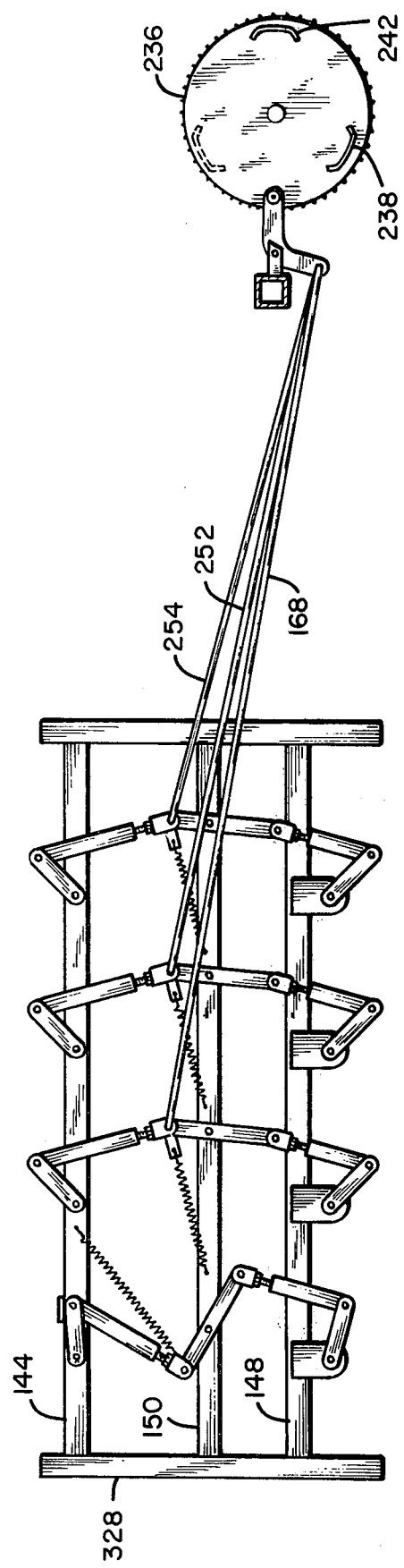
FIG. 8A is a plan view of the overall dog synchronizing mechanism.

FIG. 8A illustrates the overall mechanism for synchronizing the operation of the spear holding dogs 72, 74, 76, 78 and 80, 82. The three rods 168, 252 and 254 are operated by cams 236, 238 and 242 as was already explained in connection with FIGS. 5 and 7.

Figure 9:
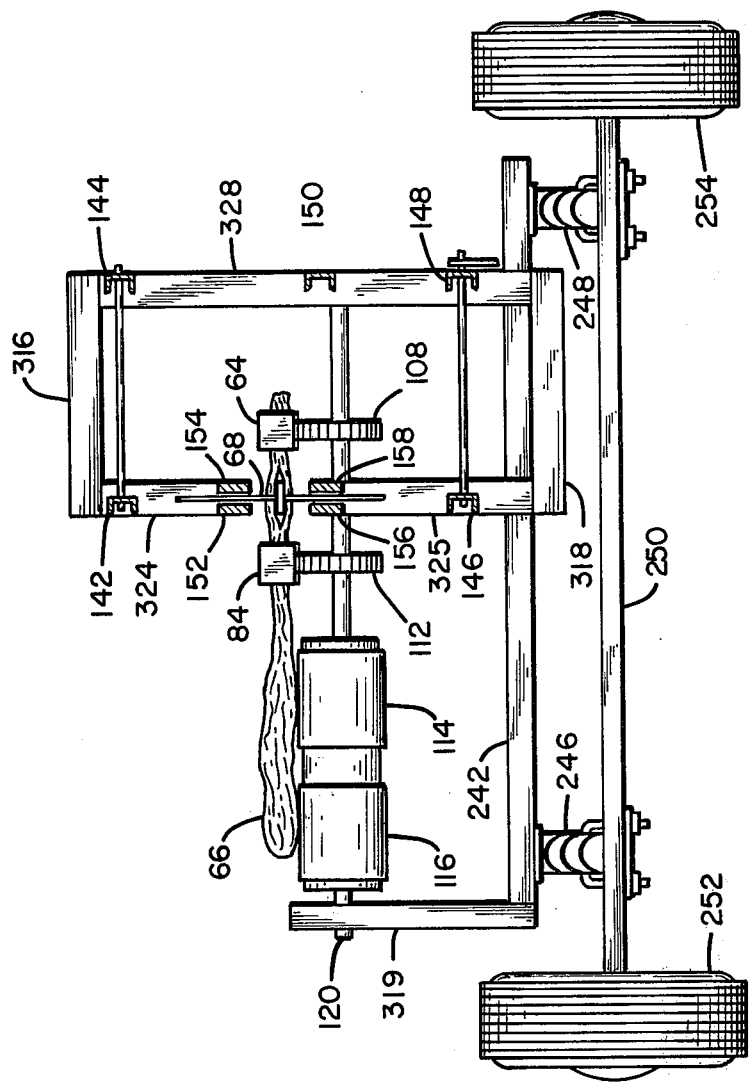
FIG. 9 is a cross-sectional view of the overall mechanism.

FIG. 9 illustrates the manner in which the apparatus may be mounted on a trailor. The structural supporting channels 142, 144, 146, 148, 150, 152, 154, 156 and 158 are shown in cross-section. Cross-supporting members 316, 318, and vertical supporting members 324, 325 and 328 hold one end of the supporting channels and similar support members hold the opposite end. Supporting beam 242 ties into this structure. Automotive type leaf springs 246, 248, axle 250 and wheels 252, 254 provide mobility for the unit. A vertical support 319 secures axle 120 relative to beam 242.

Figure 10:
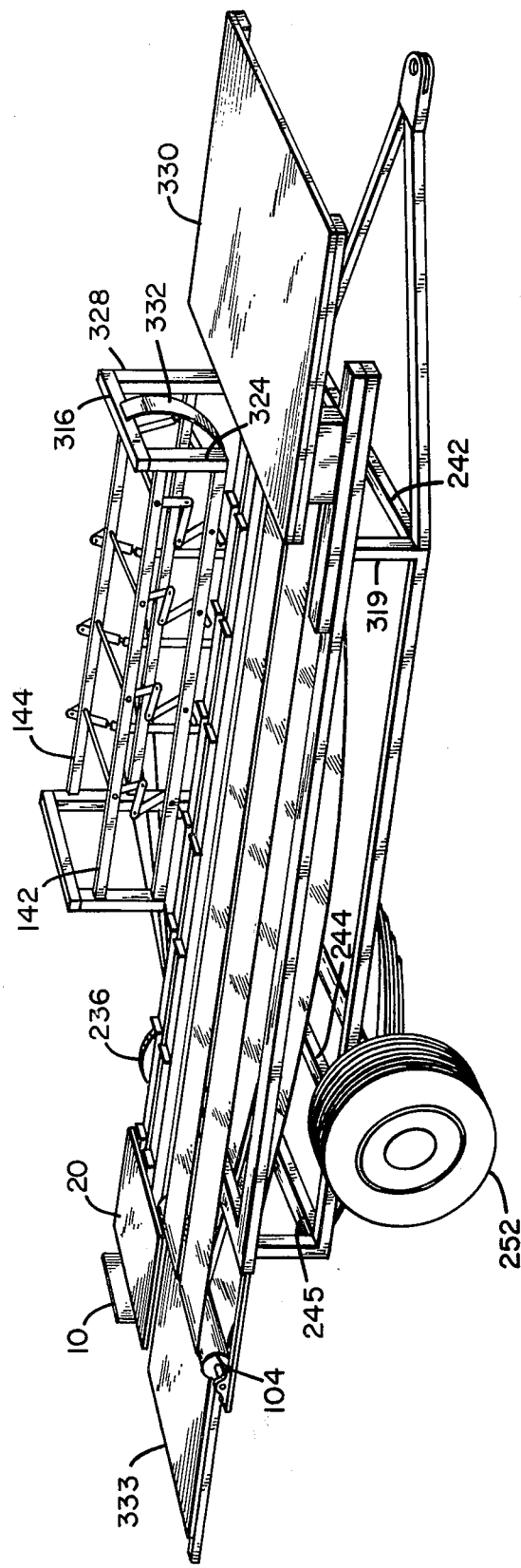
FIG. 10 is an isometric pictorial view of the overall mechanism shown mounted on a trailer.

In FIG. 10, the overall structure is illustrated in pictorial form. A table 330 is provided to place the tobacco plants upon to be fed into the mechanism. A guard 332 is provided to guide the plants into guide arm 68 and 70. An additional table 333 is provided adjacent to table 20 to support the leaf end of the tobacco plants.

In operation the loose plants are placed upon table 330 with their stems all oriented in the direction perpendicular to the spear located within the loading mechanism. The operator takes the plants one at a time and lays them such that a pair of forcing arms, e.g. 64, 84 (FIG. 6) will engage it. This process is repeated unitl a lath is filled and the mechanism stops automatically. The operator then removes the filled lath, inserts a new lath full length into the spear, and restarts the mechanism by releasing catch 31 (FIG. 6A).

Thus it can be seen that there has been provided a machine which causes tobacco plants to be loaded on laths such that a desired spacing is maintained between plants and only a modest force is applied to the leaves, insufficient to cause damage thereto. While there has been described above the principles of the invention in connection with a specific apparatus, it should be understood that this description is made only by way of example and not as a limitation to the scope of the invention as set forth in the objects thereof and in the accompanying claims.

What is claimed is:
1. A machine for facilitating the stringing of tobacco plants on laths of the type including a hollow spear member having a point at its leading edge and a trailing edge into which a lath to be loaded may be inserted, means for supporting said hollow spear and a conveyor means for advancing said plants along said spear, and onto said lath, the improvement comprising:
   a. a plurality of pairs of spear gripping dogs, each pair having oppositely disposed members engageable against said spear for spear suppot in the vertical plane;
   b. means synchronized with said conveyor means for opening and closing said pairs of gripping dogs in a predetermined sequence as said tobacco plants are advanced along said spear by said conveyor means; and
   c. variable spacing means, coupled to said conveyor means for advancing said plants, for selectively positioning said plants at intervals along said lath.
2. Apparatus as in claim 1 and further including:
   a. self-centering tobacco plant guiding means disposed proximate to the leading edges of said spear, for guiding said plant onto said spear, said guiding means comprising an upper and lower movable arm, each arm movable equidistant from said spear.
3. Apparatus as in claim 1 wherein said conveyor means includes:
   a. a source of motive power;
   b. first and second chain drive assemblies, each including first and second pairs of sprocket wheels affixed, respectively, to first and second spaced apart driven shafts and first and second endless chains passing around said first and second pairs of sprocket wheels;
   c. a plurality of pairs of forcing arms attached to said first and second endless chains in alignment with one another for applying a pushing force to said plants;
   d. first and second drums axially mounted individually on said first and second driven shafts and having a diameter substantially the same as the diameter of said first and second pairs of sprocket wheels and an endless belt passing around said first and second drums; and
   e. means for coupling said source of motive power to one of said first and second spaced apart driven shafts.
4. Apparatus as in claim 3 wherein said spear is held by said gripping dogs in a horizontal plane defined by the upper legs of said first and second endless chains and midway between said first and second endless chains.
5. Apparatus as in claim 3 and further including:
   a. a plurality of cams affixed to one of said first and second pairs of sprocket wheels;
   b. cam follower means positioned with respect to said one of said first and second pairs of sprocket wheels for individually cooperating with said cam means; and
   c. linkage means connected between said cam follower means and said plurality of pairs of spear gripping dogs for causing said pairs of dogs to disengage and re-engage said spear in sequence as said one of said first and second pairs of sprocket wheels is rotated by said source of motive power.

6. Apparatus as in claim 3 wherein said variable spacing means is connected in proximity to said trailing edge of said spear and adapted to cooperate with said plurality of pairs of forcing arms attached to said first and second endless chains as said forcing arms move past said variable spacing means for removing said pushing force from said plants at a predetermined and adjustable position with respect to said trailing edge of said spear.

7. Apparatus as in claim 3 and further including:

a. a trip plate positioned a predetermined distance from said conveyor means and adapted to be actuated by said lath when in an extended position from said spear; and
b. a clutch means for coupling said source of motive power to said one of said first and second spaced apart driven shafts; and
c. actuator means coupling said trip plate to said clutch for disengaging said source of motive power from said drive shaft; and
d. manually operable clutch engaging means connected to said actuator for re-engaging said clutch.

* * * * *